(12) United States Patent
Davis et al.

(10) Patent No.: US 7,380,065 B2
(45) Date of Patent: May 27, 2008

(54) PERFORMANCE OF A CACHE BY DETECTING CACHE LINES THAT HAVE BEEN REUSED

(75) Inventors: Gordon T. Davis, Chapel Hill, NC (US); Santiago A. Leon, Austin, TX (US); Hans-Werner Tast, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 11/094,399

(22) Filed: Mar. 30, 2005

(65) Prior Publication Data

US 2006/0224830 A1    Oct. 5, 2006

(51) Int. Cl.
*G06F 13/00* (2006.01)
(52) U.S. Cl. .................. 711/134; 711/144; 711/221
(58) Field of Classification Search ................ 711/144, 711/145, 146, 166, 216
See application file for complete search history.

(56) References Cited

U.S. PATENT DOCUMENTS

| | | | |
|---|---|---|---|
| 4,740,969 A * | 4/1988 | Fremont | 714/15 |
| 5,428,761 A * | 6/1995 | Herlihy et al. | 711/130 |
| 5,546,559 A | 8/1996 | Kyushima et al. | 395/460 |
| 5,590,300 A | 12/1996 | Lautzenheiser | 395/412 |
| 5,594,885 A | 1/1997 | Lautzenheiser | 395/460 |
| 5,867,511 A * | 2/1999 | Arimilli et al. | 714/805 |
| 6,226,715 B1 | 5/2001 | Van Der Wolf et al. | 711/133 |
| 6,393,525 B1 | 5/2002 | Wilkerson et al. | 711/136 |
| 2002/0087802 A1 * | 7/2002 | Al-Dajani et al. | 711/137 |

OTHER PUBLICATIONS

"Cache Reuse Bit," *IBM Technical Disclosure Bulletin*, vol. 30, No. 6, Nov. 1987, pp. 16-17.

* cited by examiner

*Primary Examiner*—Reba I Elmore
(74) *Attorney, Agent, or Firm*—Joscelyn G. Cockburn; Robert A. Voigt, Jr.; Winstead, P.C.

(57) ABSTRACT

A method and system for improving the performance of a cache. The cache may include an array of tag entries where each tag entry includes an additional bit ("reused bit") used to indicate whether its associated cache line has been reused, i.e., has been requested or referenced by the processor. By tracking whether a cache line has been reused, data (cache line) that may not be reused may be replaced with the new incoming cache line prior to replacing data (cache line) that may be reused. By replacing data in the cache memory that might not be reused prior to replacing data that might be reused, the cache hit may be improved thereby improving performance.

8 Claims, 6 Drawing Sheets

PERFORMANCE OF A CACHE BY DETECTING CACHE LINES THAT HAVE BEEN REUSED

TECHNICAL FIELD

The present invention relates to the field of a data processing system, and more particularly to improving the performance of a cache by adding a bit to each tag entry in the tag array in order to track the reuse of the associated cache line.

BACKGROUND INFORMATION

A conventional data processing system may include a processor coupled to a system memory where the processor may be associated with one or more levels of cache. A cache includes a relatively small, high speed memory ("cache memory") that contains a copy of information from one or more portions of the system memory. Frequently, the cache memory is physically distinct from the system memory. A Level-1 (L1) cache or primary cache may be built into the integrated circuit of the processor. The processor may be associated with additional levels of cache, such as a Level-2 (L2) cache and a Level-3 (L3) cache. These higher level caches, e.g., L2, L3, may be employed to stage data to the L1 cache and typically have progressively larger storage capacities but longer access latencies.

The cache memory may be organized as a collection of spatially mapped, fixed size storage region pools commonly referred to as "congruence classes." Each of these storage region pools typically comprises one or more storage regions of fixed granularity. These storage regions may be freely associated with any equally granular storage region in the system as long as the storage region spatially maps to a congruence class. The position of the storage region within the pool may be referred to as the "set." The intersection of each congruence class and set contains a cache line. The size of the storage granule may be referred to as the "cache line size." A unique tag may be derived from an address of a given storage granule to indicate its residency in a given congruence class and set.

When a processor generates a request of an address of data (a read request) and the requested data resides in its cache memory, e.g., L1 cache memory, then a "cache hit" is said to take place. The processor may then obtain the data from the cache memory without having to access the system memory. If the data is not in the cache memory, then a "cache miss" is said to occur. The memory request may be forwarded to the system memory and the data may subsequently be retrieved from the system memory as would normally be done if the cache did not exist. On a cache miss, the data that is retrieved from the system memory may be provided to the processor and may also be written into the cache memory due to the statistical likelihood that this data will be requested again by that processor. Likewise, if a processor generates a write request, the write data may be written to the cache memory without having to access the system memory over the system bus.

As is known to those skilled in the art, a wide variety of cache configurations or organizations are commonly available. For example, a "direct-mapped" cache is organized such that for each addressed location in main memory, there exists one and only one location in a cache data array that could include a copy of such data. In an "n-way set-associative" cache, the cache is configured such that for any one addressed location in main memory, there exists n possible locations within the cache data array that might include a copy of such data.

There have been many methods in designing caches that seek to increase the cache hit rate thereby improving performance of the cache. A "cache hit rate" may refer to the rate at which cache hits occur relative to the total number of accesses that are made to the cache. By improving the cache hit rate, the performance of the system may be improved, i.e., less data needs to be serviced from system memory.

In an "n-way set-associative" cache, one way to improve the performance of the cache is to use a Least Recently Used (LRU) replacement method to assist in determining how data is to be managed in the cache. The LRU replacement method uses a single logical stack construct composed of "n" elements for each of the congruence classes in an n-way set-association cache where each cache entry stores particular data. A congruence class may refer to "n" cache lines (corresponding to the number of ways) whose addresses are a modulo of one another. As stated above, if an item, e.g., data, requested by the processor is present in the cache memory, a "cache hit" is said to occur. When a cache hit occurs, the cache entry comprising the information, e.g., data, requested is considered to become the "most recently used" item in its congruence class and is logically moved from its current location in the stack to the top of the stack. The entry in the congruence class that can logically be viewed as being at the bottom of the stack is the "least recently used" item in the congruence class. As stated above, if an item, e.g., data, requested by the processor is not present in the cache memory, a "cache miss" is said to occur. When a cache miss occurs, the requested item is retrieved from system memory and then stored in the top stack position. When a new entry (cache line) is inserted in the stack, the cache entry (cache line) in the bottom stack position of the stack is evicted. The information, e.g., data, at that entry may subsequently be discarded, or written back to system memory if the cache entry contains a recent update. When there is a cache hit to an entry in the middle of the stack, that entry is moved to the top of the stack. Those entries that are located above the entry requested are each shifted down one position to fill the void left by the entry that moved to the top of the stack.

When using the LRU replacement method briefly described above, a new cache line replaces an old cache line that has not been requested (or what may be referred to as "referenced") by the processor for the longest time. Some cache lines are only referenced once but may remain in the cache memory waiting for a second reference that may never come. For example, streaming input and output files as well as random references to large table or chain pointers may only be referenced once. By holding to such data in the cache memory, other data or instructions that might be reused may be replaced in the cache memory to make room for the data that is not reused. By replacing data in the cache memory that might be reused to make room for the data that is not reused, the cache hit rate may be reduced and subsequently diminish performance.

If, however, the reuse characteristics of the cache data were detected prior to having reusable data being replaced to make room for the data that is not reused, then data (cache line) that may not be reused may be replaced with the new incoming cache line prior to replacing data (cache line) that may be reused. By replacing data in the cache memory that might not be reused prior to replacing data that might be reused, the cache hit may be improved thereby improving performance.

Therefore, there is a need in the art to detect data that has been reused thereby ensuring that non-reusable data may be replaced prior to reusable data in the LRU replacement method.

SUMMARY

The problems outlined above may at least in part be solved in some embodiments by adding a bit to each tag entry in the cache to indicate whether its associated cache line has been reused, i.e., has been requested or referenced by the processor. By tracking whether a cache line has been reused, data (cache line) that may not be reused may be replaced with the new incoming cache line prior to replacing data (cache line) that may be reused. By replacing data in the cache memory that might not be reused prior to replacing data that might be reused, the cache hit may be improved thereby improving performance.

In one embodiment of the present invention, a method for improving the performance of a cache may comprise the step of receiving a request of an address of data. The method may further comprise determining if the requested data is located in the cache. The method may further comprise setting a bit in a tag associated with a cache line to a second state if the requested data is located within the cache line of the cache where the bit indicates whether the cache line has been reused.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method and system for improving the performance of a cache. In one embodiment of the present invention, a cache may include an array of tag entries where each tag entry includes an additional bit ("reused bit") used to indicate whether its associated cache line has been reused, i.e., has been requested or referenced by the processor. By tracking whether a cache line has been reused, data (cache line) that may not be reused may be replaced with the new incoming cache line prior to replacing data (cache line) that may be reused. By replacing data in the cache memory that might not be reused prior to replacing data that might be reused, the cache hit may be improved thereby improving performance.

Although the present invention is described with reference to a level-2 cache, it is noted that the principles of the present invention may be applied to any level cache, although it may be advantageously applied to higher levels of cache, i.e., level-2 or level-3 cache. It is further noted that embodiments applying the principles of the present invention to any level cache would fall within the scope of the present invention.

Additionally, while certain actions may result depending on whether a value is a logical value of "1" or "0", alternative embodiments in accordance with the present inventive principles may be implemented in the context of the same action resulting from the opposite value, e.g., value of "0" instead of the logical value of "1," and such embodiments would also fall within the spirit and scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
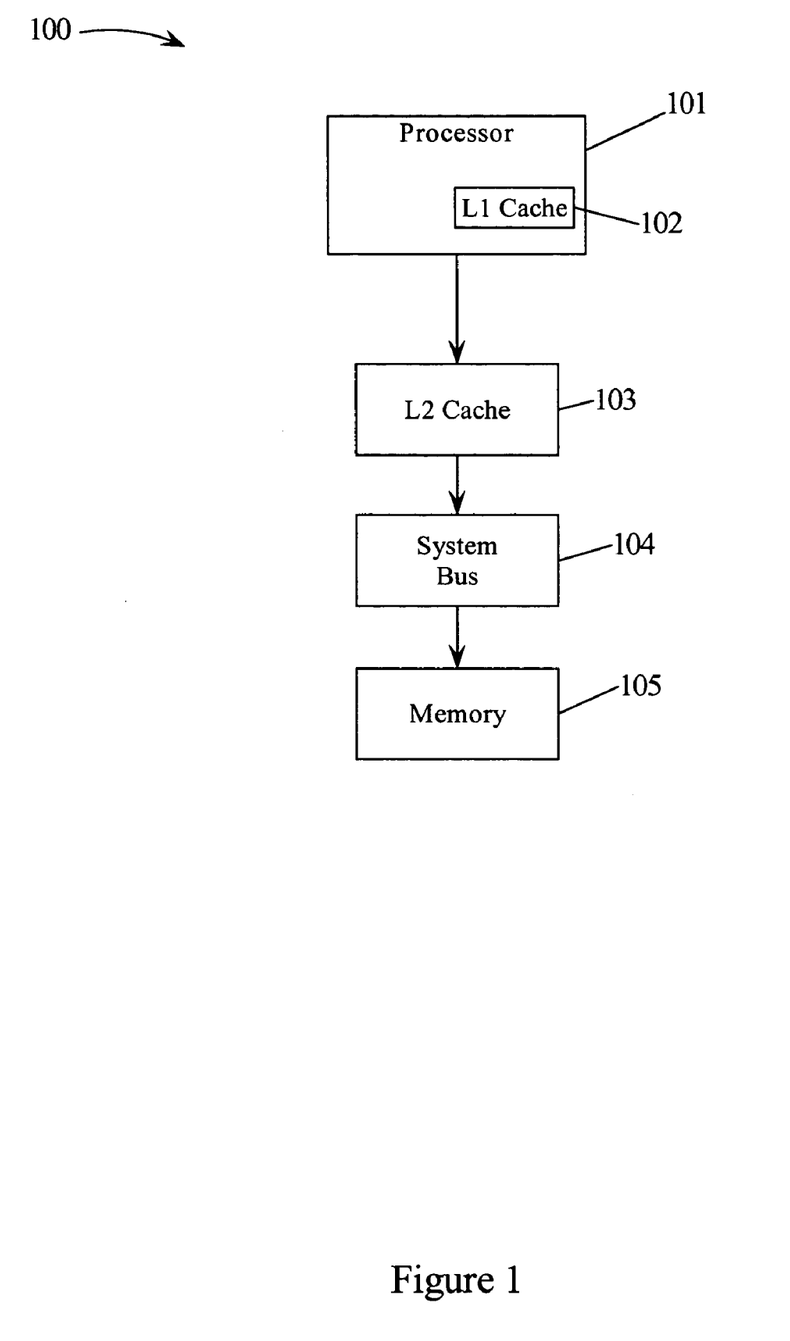
FIG. 1 illustrates a system in accordance with an embodiment of the present invention.

FIG. 1—System

FIG. 1 illustrates an embodiment of the present invention of a system 100. System 100 may include one or more processors 101. Processor 101 may include at least one level one (L1) cache 102, e.g., L1 instruction cache, L1 data cache. L1 cache 102 may be configured to store instructions or data that may be repeatedly accessed by processor 101. In order to minimize data access latency, one or more additional levels of cache memory coupled to processor 101 may be implemented such as a level two (L2) cache 103 coupled to processor 101. At level 1, data and instructions are typically handled by separate caches, while higher levels of cache may unify the handling of instructions and data into a common or unified cache. A more detail description of L2 cache 103 is provided below in association with FIG. 2. The higher cache levels, e.g., L2 cache 103, may be employed to stage data to an L1 cache, e.g., L1 cache 102, and typically have progressively larger storage capacities but longer access latencies. In one embodiment, L2 cache 103 uses the same sized cache line as L1 cache 102. Referring to FIG. 1, processor 101 may be coupled to system memory 105 via system bus 104. Bus 104 may subsequently permit the transfer of information, e.g., addresses, data, between processor 101 and system memory 105. It is noted that one of ordinary skill in the art will readily recognize that system 100 may include other and/or additional devices that, for clarity, are not depicted. It is further noted that system 100 may be any type of system with multiple levels of cache and that FIG. 1 is not to be limited in scope to any one particular embodiment.

Figure 2:
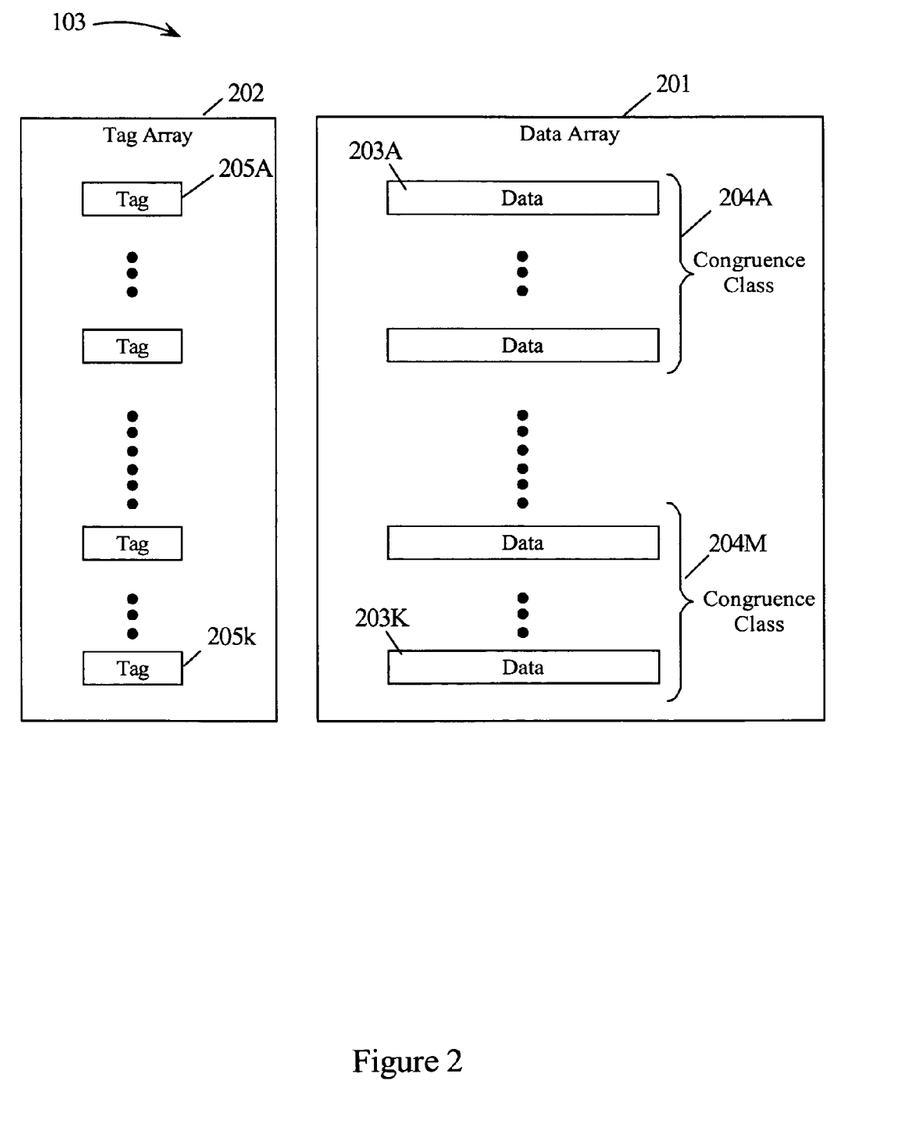
FIG. 2 illustrates an embodiment of the present invention of a tag and data array in a higher level cache, such as a level-2 cache.

FIG. 2—Tag and Data Array in L2 Cache

FIG. 2 illustrates an embodiment of the present invention of L2 cache 103 (FIG. 1). L2 cache 103 may include a data array 201 and a tag array 202. Data array 201 (cache memory of L2 cache 103) may include a plurality of cache lines 203A-K, where K is any number. Cache lines 203A-K may collectively or individually be referred to as cache lines 203 or cache line 203, respectively. Cache lines 203 may be grouped into congruence classes 204A-M, where M is any number. Congruence classes 204A-M may collectively or individually be referred to as congruence classes 204 or congruence class 204, respectively. The number of cache lines 203 in a congruence class 204 corresponds to the number of ways in an "n-way set-associative" cache.

Tag array 202 may include a plurality of tags 205A-K, where K is the number of cache lines 203. Tags 205A-N may collectively or individually be referred to as tags 205 or tag 205, respectively. Each tag 205 may be associated with a particular cache line 203 and contain information regarding that particular cache line as illustrated in FIG. 3.

Figure 3:
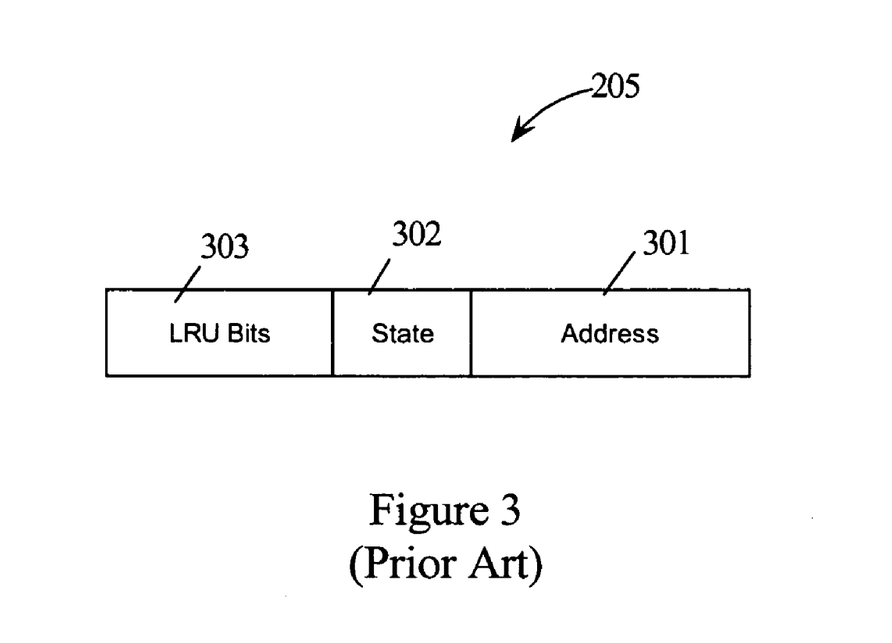
FIG. 3 illustrates a tag entry in a tag array.

FIG. 3—Tag Entry in Tag Array

FIG. 3 illustrates the typical information contained in tag entry ("tag") 205 (FIG. 2). Referring to FIG. 3, in conjunction with FIG. 2, tag 205 may include fields 301-303. Field 301 may contain an address of its associated cache line 203. The address may be either an effective address or a real address. Field 302 may contain a state of its associated cache line 203. Each cache line 203 may be said to exist in four states: modified, exclusive, shared or invalid. Specific implementations may include additional states not discussed here. These states are well known in the art and will not be discussed in detail for the sake of brevity. Field 303 may contain a least recently used status for its associated cache line 203. That is, field 303 may contain a value indicating in what position its associated cache line 203 is located in the logical stack using the LRU replacement method as described in the Background Information section. The number of bits of field 303 (field 303 may be said to store "LRU bits") is directly related to the number of cache lines 203 in a congruence class 204. For example, if there are eight cache lines 203 in a congruence class 204, then the length of field 303 is three bits used to track the use order of the eight cache lines 203. Field 303 may store a lowest number, e.g., 000 in binary, for cache line 203 who is least recently used. That is, field 303 may store a lowest number, e.g., 000 in binary, for cache line 203 located at the bottom of the logical stack. Field 303 may store the largest number, e.g., 111 in binary, for cache line 203 corresponding to the most recently used. That is, field 303 may store the largest number, e.g., 111 in binary, for cache line 203 located at the top of the logical stack. Whenever cache line 203 is accessed, it becomes the most recently used resulting in a change in its LRU bits 303, e.g., 111 in binary. That is, whenever cache line 203 is accessed, it becomes located at the top of the logical stack. The other cache lines 203 originally located above the accessed cache line in the logical stack may then be pushed down the logical stack to make room for the new most recently used cache line 203. These cache lines 203 that were pushed down the logical stack may have their LRU bits 303 modified to indicate that they are less recently used now.

As stated in the Background Information section, when using the LRU replacement method a new cache line replaces an old cache line that has not been requested (or what may be referred to as "referenced") by the processor for the longest time. Some cache lines are only referenced once but may remain in the cache memory waiting for a second reference that may never come. For example, streaming input and output files as well as random references to large table or chain pointers may only be referenced once. By holding to such data in the cache memory, other data or instructions that might be reused may be replaced in the cache memory to make room for the data that is not reused. By replacing data in the cache memory that might be reused to make room for the data that is not reused, the cache hit rate may be reduced and subsequently diminish performance. If, however, the reuse characteristics of the cache data were detected prior to having reusable data being replaced to make room for the data that is not reused, then data (cache line) that may not be reused may be replaced with the new incoming cache line prior to replacing data (cache line) that may be reused. By replacing data in the cache memory that might not be reused prior to replacing data that might be reused, the cache hit may be improved thereby improving performance. Therefore, there is a need in the art to detect data that has been reused thereby ensuring that non-reusable data may be replaced prior to reusable data in the LRU replacement method. Cache lines that have been reused may be easily detected by adding an additional bit to tag 205 as illustrated in FIG. 4.

Figure 4:
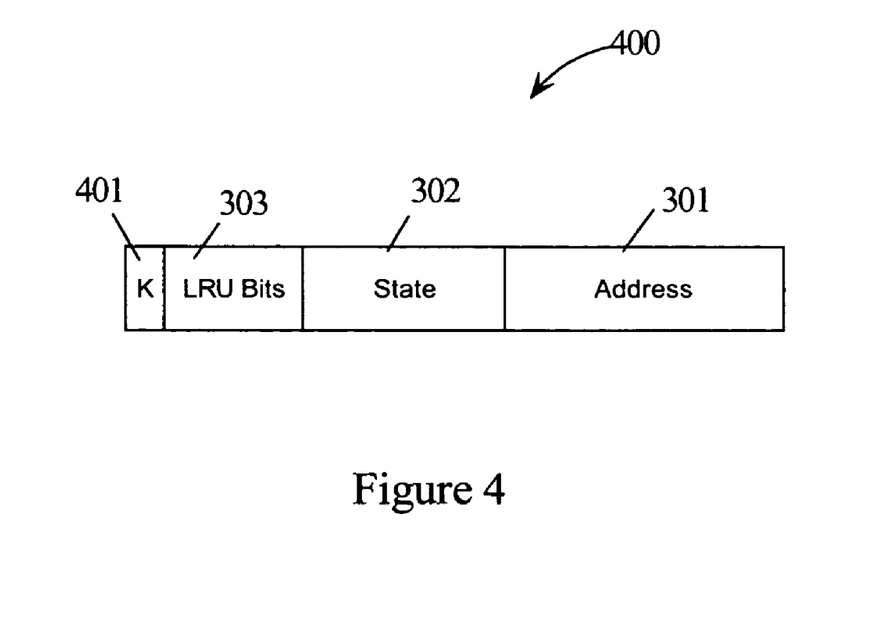
FIG. 4 illustrates an embodiment of the present invention of a modified tag entry in a tag array that includes a reused bit used to indicate whether its associated cache line has been reused in accordance with an embodiment of the present invention.

FIG. 4—Modified Tags in Tag Array Used to Indicate Whether Associated Cache Line has been Reused

FIG. 4 illustrates a tag 400 configured to indicate whether its associated cache line 203 (FIG. 2) has been reused in accordance with an embodiment of the present invention. Referring to FIG. 4, in conjunction with FIG. 3, tag 400 is identical to tag 205, including its functionality as described above, except for an additional bit 401 (labeled as "R") used to indicate whether its associated cache line 203 has been reused, i.e., indicate whether its associated cache line 203 has been referenced by processor 101 (FIG. 1). The state of bit 401 may indicate whether its associated cache line 203 has been reused, i.e., requested by processor 101, or not. For example, if the state of bit 401 is zero, then its associated cache line 203 has not been reused. However, if the state of bit 401 is a logical value of one, then its associated cache 203 has been reused. Bit 401 may be initially cleared to zero when new data is located in cache line 203 and set to the logical value of one when that cache line 203 is read subsequent to the initial access by processor 101. The state of bit 401 may be managed in each tag entry 205 using the method described below in association with FIGS. 5A-B.

Figure 5A:
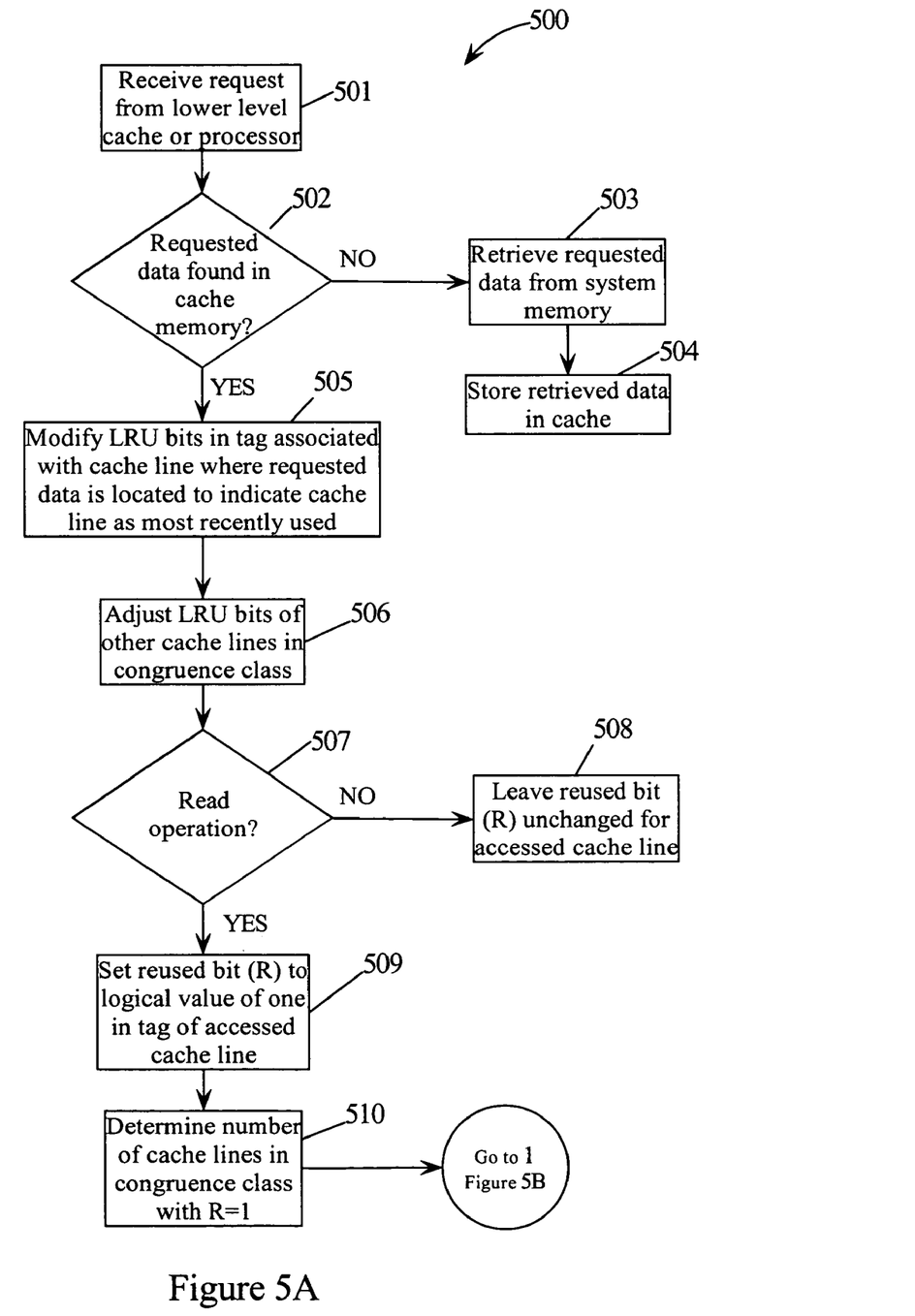
FIGS. 5A-B are a flowchart for a method for managing the state of a reused bit used in determining whether its associated cache line has been reused in accordance with an embodiment of the present invention.
Figure 5B:
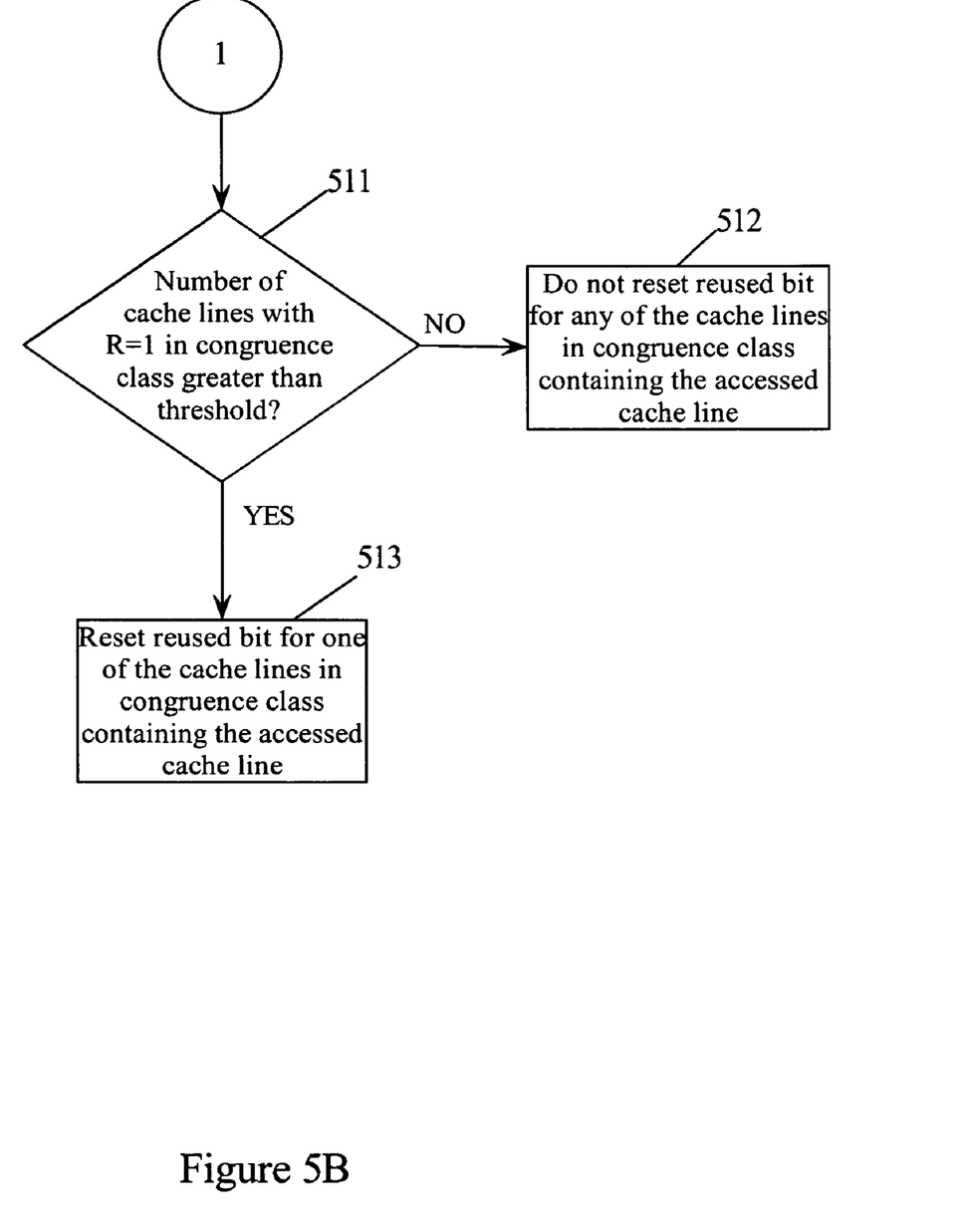

FIGS. 5A-B—Method for Managing the State of a Reused Bit Used in Determining Whether its Associated Cache Line has been Reused

FIGS. 5A-B are a flowchart of one embodiment of the present invention for a method 500 for managing the state of reuse bit 401 (FIG. 4) used in determining whether its associated cache line 203 (FIG. 2) has been reused, i.e., whether its associated cache line 203 has been referenced by processor 101 (FIG. 1).

Referring to FIG. 5A, in conjunction with FIGS. 1-2 and 4, in step 501, L2 cache 103 receives a request from a lower level cache, e.g., L1 cache 102, or processor 101.

In step 502, L2 cache 103 determines whether the requested data is found in its cache memory 201. If the requested data is not found in its cache memory 201, then, in step 503, then the data is retrieved from system memory 105. In step 504, the retrieved data is stored in L2 cache 103 using the method as discussed below in association with FIG. 6.

If, however, the requested data is found in cache memory 201, then, in step 505, L2 cache 103 modifies LRU bits 303 in tag 400 associated with cache line 203 (cache line 203 where the requested data is located) to indicate cache line 203 as the most recently used.

In step 506, L2 cache 103 adjusts LRU bits 303 in tag 400 for other cache lines in congruence class 204 that need to be adjusted. For example, suppose there are eight cache lines 203 in congruence class 204. Suppose further that the cache line 203 located in the third position of the logical stack implementing the LRU replacement method contained the requested data. Cache line 203 would then be moved to the top of the logical stack which is indicated by changing the value of LRU bits 303 to its largest value, e.g., 111 in binary. The other cache lines 203 originally located above the accessed cache line (cache lines 203 located in the first and second position) in the logical stack may then be pushed down the logical stack to make room for the new most recently used cache line 203. These cache lines 203 that were pushed down the logical stack may have their LRU bits 303 modified to indicate that they are less recently used now.

In step 507, L2 cache 103 determines whether the request is a read request. That is, L2 cache 103 determines if processor 101 issued a read request. If processor 101 did not issue a read request but issued a write request, then, in step 508, reused bit 401 remains unchanged for the accessed cache line 203. Reused bit 401 remains unchanged when processor 101 issues a write request since the lower level cache, L1 cache 102, may implement a write-through policy where every write in L1 cache 102 may result in an update of the corresponding cache line 203 in the higher level cache, e.g., L2 cache 103. Hence, a write-through may indicate that a cache line is being written to multiple times even with streaming input and output files as well as random references to large table or chain pointers, even though each individual word within the cache line may only be referenced once. Thus, in one embodiment of the present invention, the state of reused bit 401 may depend on the read operation and not on the write operation.

If, however, L2 cache 103 determines that processor 101 issued a read request, then, in step 509, L2 cache 103 sets reused bit 401 in tag 400 associated with the accessed cache line 203 to a logical value of one. In step 510, L2 cache 103 determines the number of cache lines 203 in congruence class 204 containing the accessed cache line 203 marked with a logical value of one in the corresponding reused bit 401. That is, L2 cache 103 determines the number of cache lines 203 in congruence class 204 (congruence class 204 containing the accessed cache line 203) that have its reused bit 401 indicating that they have been reused, i.e., referenced by processor 101 in addition to the initial access.

Referring to FIG. 5B, in conjunction with FIGS. 1-2 and 4, in step 511, L2 cache 103 determines whether the number of cache lines 203 in congruence class 204 (congruence class 204 containing the accessed cache line 203) that have its reused bit 401 indicating that they have been reused exceeds a threshold. In one embodiment, the threshold equals W/2 where W is the number of ways in each congruence class 204.

If the number of cache lines 203 in congruence class 204 (congruence class 204 containing the accessed cache line 203) that have its reused bit 401 equal to the logical value of one does not exceed the threshold, then, in step 512, L2 cache 103 does not reset reused bit 401 for any of the cache lines 203 in congruence class 204 containing the accessed cache line 203.

If, however, the number of cache lines 203 in congruence class 204 (congruence class 204 containing the accessed cache line 203) that have its reused bit 401 equal to the logical value of one exceeds the threshold, then, in step 513, L2 cache 103 resets reused bit 401 for one of the cache lines 203 in congruence class 204 (congruence class 204 containing the accessed cache line 203). In one embodiment, the least recently used cache line 203 of those cache lines 203 in accessed congruence class 204 that have reused bit 401 set to a logical value of one has its reused bit 401 reset.

It is noted that the above mentioned method is used when the higher level cache, L2 cache 103 uses the same sized cache line as the lower level cache, L1 cache 102. It is further noted that in the case where the lower level cache, L1 cache 102, uses a smaller cache line 203 than used in the higher level cache, L2 cache 103, that each cache line 203 would be partitioned into segments where each segment corresponds to a cache line 203 in the lower level cache. L2 cache 103 would then track reuse of each segment of cache lines 203 in the same manner as described above. There would be a bit, such as bit 401, for each segment as well as a single reused bit 401 for the entire cache line 203. It is further noted that the principles of the present invention described herein would apply to such an implementation. It is further noted that such an implementation would fall within the scope of the present invention.

It is further noted that the scheme described in the above paragraph would also be applicable to an L1 cache 102 where the segment size is equal to the width of an access by processor 101. It is further noted that the principles of the present invention described herein would apply to such an implementation. It is further noted that such an implementation would fall within the scope of the present invention.

It is noted that L2 cache 103 contains the logic to perform the above-mentioned steps in method 500. It is further noted that method 500 may include other and/or additional steps that, for clarity, are not depicted. It is further noted that method 500 may be executed in a different order presented and that the order presented in the discussion of FIGS. 5A-B are illustrative. It is further noted that certain steps in method 500 may be executed in a substantially simultaneous manner.

Figure 6:
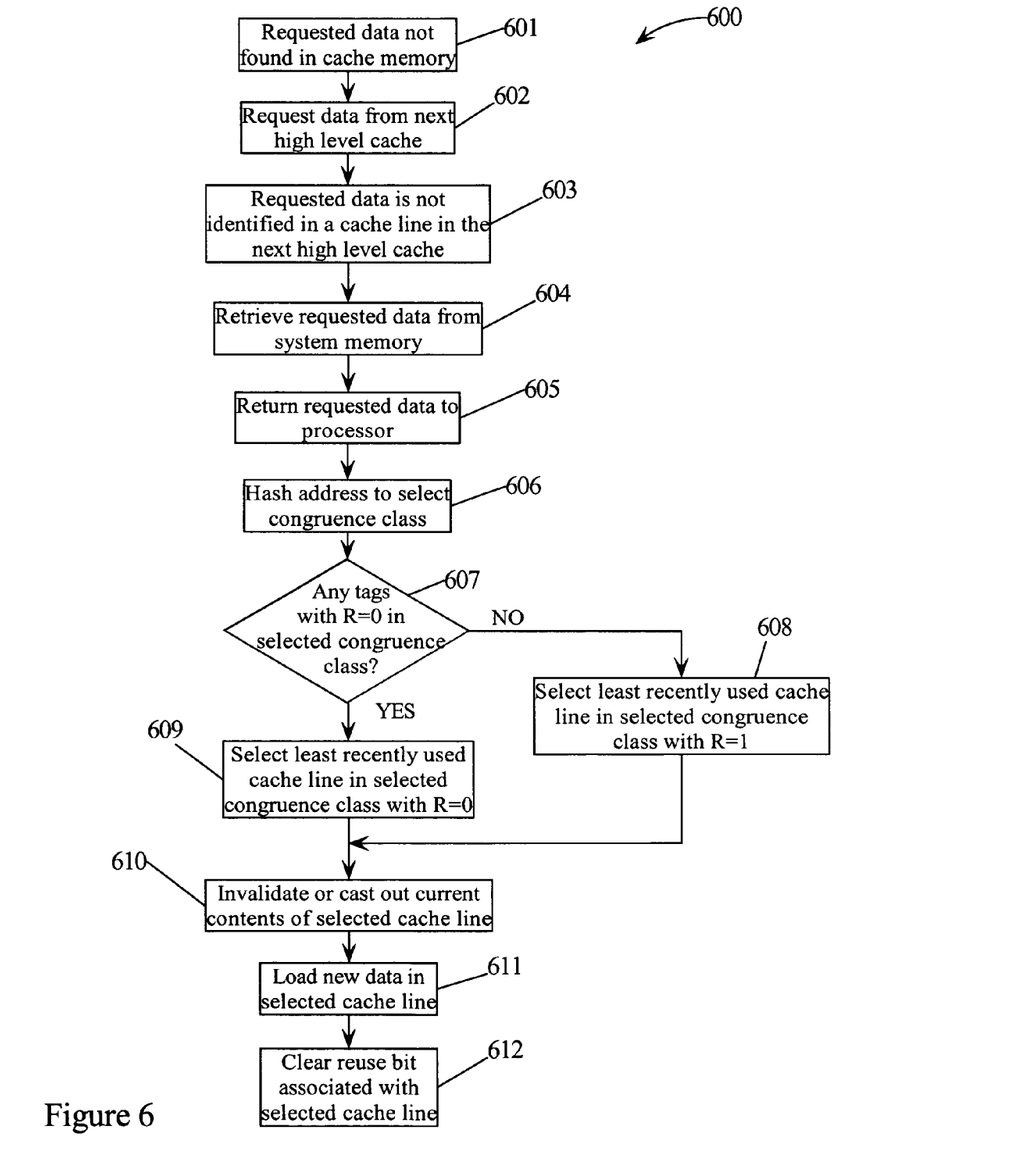
FIG. 6 is a flowchart of a method for performing the least recently used (LRU) replacement method using the reused bit in the tag entry in accordance with an embodiment of the present invention.

As stated above, in step 504, the retrieved data is stored in L2 cache 103 using the method as discussed below in association with FIG. 6. FIG. 6 is a method of performing the least recently used replacement method using the reused bit 401 in tag 400.

FIG. 6—Method for Performing Least Recently Used (LRU) Replacement Method Using Reused Bit in Tag FIG. 6 is a flowchart of one embodiment of the present invention of a method 600 for performing the LRU replacement method using reused bit 401 (FIG. 4) in tag 400 (FIG. 4).

Referring to FIG. 6, in conjunction with FIGS. 1-2 and 4, in step 601, data requested by processor 101 is not found in the cache memory of L1 cache 102. In step 602, the data is requested from the next high level cache, L2 cache 103. In step 603, the requested data is not identified in a cache line 203 in L2 cache 103. In step 604, the requested data is retrieved from system memory 105. In step 605, the requested data is returned to processor 101.

In step 606, the address of the requested data is hashed according to well-known mapping techniques commonly used in cache designs to select a congruence class 204 in L2 cache 103. The hashing techniques may involve masking off some most significant and least significant address bits and using midrange bits to select congruence class 204.

In step 607, a determination is made by L2 cache 103 as to whether any tags 400 have a reused bit 401 equal to zero (referring to those cache lines 203 that have not been reused) in the selected congruence class 204.

If there are no reused bits 401 with a value equal to zero for any of the cache lines 203 in the selected congruence class 204, then, in step 608, L2 cache 103 selects the least recently used cache line 203 in the selected congruence class 204 with reused bit 401 storing a value equal to the logical value of one.

If, however, there is a reused bit 401 for at least one of the cache lines 203 in the selected congruence class 204 that has a value equal to zero, then, in step 609, L2 cache 103 selects the least recently used cache line 203 in the selected congruence class 204 having reused bit 401 equal to zero.

Upon selecting the least recently used cache line 203 in the selected congruence class 204 having reused bit 401 equal to zero in step 609 or upon selecting the least recently used cache line 203 in the selected congruence class 204 having reused bit 401 equal to a logical value of one in step 608, cache line 103 invalidates or cast outs the current contents of the selected cache line 203 in step 610. In step 611, new data is loaded in the selected cache line 203. In step 612, reused bit 401 associated with the selected cache line 203 is cleared.

It is noted that L2 cache 103 contains the logic to perform the above-mentioned steps in method 600. It is further noted that method 600 may include other and/or additional steps that, for clarity, are not depicted. It is further noted that method 600 may be executed in a different order presented and that the order presented in the discussion of FIG. 6 is illustrative. It is further noted that certain steps in method 600 may be executed in a substantially simultaneous manner.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for improving the performance of a cache comprising the steps of:
   receiving a request of an address of data;
   determining if said requested data is located in said cache;
   setting a bit in a tag associated with a cache line to a second state if said requested data is located within said cache line of said cache, wherein said bit indicates whether said cache line has been reused;
   wherein said cache line is grouped with other cache lines in a congruence class, wherein each cache line in said congruence class is associated with a tag containing a bit indicating whether its associated cache line has been reused; and
   resetting said bit for one of said cache lines in said congruence class if a number of cache lines in said congruence class identified as being reused exceeds a threshold.

2. The method as recited in claim 1 further comprising the step of:
   modifying a field of said tag associated with said cache line to indicate said cache line is most recently used, wherein said field is configured to track a least recently used status of said cache line.

3. The method as recited in claim 2 further comprising the step of:
   adjusting least recently used statuses of said other cache lines in said congruence class.

4. The method as recited in claim 1 further comprising the step of:
   leaving said bit in said tag associated with said cache line to remain in a first state if said request is a write request.

5. The method as recited in claim 1 further comprising the step of:
   hashing said address to select said congruence class.

6. The method as recited in claim 5 further comprising the steps of:
   selecting a least recently used cache line in said congruence class with said bit in said tag associated with said least recently used cache line indicating said least recently used cache line has not been reused;
   invaliding current contents of said selected least recently used cache line; and
   loading new data in said selected least recently used cache line.

7. The method as recited in claim 6 further comprising the step of:
   clearing said bit in said tag associated with said selected least recently used cache line.

8. The method as recited in claim 5 further comprising the step of:
   selecting a least recently used cache line in said congruence class with said bit in said tag associated with said least recently used cache line indicating said least recently used cache line has been reused if there are no cache lines in said congruence class that has not been reused.

* * * * *